United States Patent
Schnetzka et al.

(10) Patent No.: US 7,425,806 B2
(45) Date of Patent: Sep. 16, 2008

(54) SYSTEM AND METHOD FOR CONTROLLING A VARIABLE SPEED DRIVE

(75) Inventors: Harold Robert Schnetzka, York, PA (US); Ivan Jadric, York, PA (US); Scott Victor Slothower, Dillsburg, PA (US)

(73) Assignee: York International Corporation, York, PA (US)

( * ) Notice: Subject to any disclaimer, the term of this patent is extended or adjusted under 35 U.S.C. 154(b) by 820 days.

(21) Appl. No.: 10/822,489

(22) Filed: Apr. 12, 2004

(65) Prior Publication Data

US 2005/0225270 A1    Oct. 13, 2005

(51) Int. Cl.
*H02P 5/00* (2006.01)
*H02M 7/515* (2007.01)

(52) U.S. Cl. .................. 318/41; 318/66; 318/801; 363/34; 363/71

(58) Field of Classification Search .......... 318/66, 318/41, 801; 363/71, 34; 388/811
See application file for complete search history.

(56) References Cited

U.S. PATENT DOCUMENTS

| | | | |
|---|---|---|---|
| 3,781,615 A * | 12/1973 | Mokrytzki et al. | .......... 318/801 |
| 4,674,024 A | 6/1987 | Paice et al. | |
| 4,953,069 A * | 8/1990 | Braun et al. | .................. 363/41 |
| 5,285,372 A | 2/1994 | Huynh et al. | |
| 5,351,181 A * | 9/1994 | Brennen et al. | ................ 363/71 |
| 5,751,138 A | 5/1998 | Venkata et al. | |
| 5,933,339 A * | 8/1999 | Duba et al. | ................... 363/71 |
| 6,101,109 A * | 8/2000 | Duba et al. | ................... 363/71 |
| 6,111,440 A | 8/2000 | Rajagopalan et al. | |
| 6,118,932 A * | 9/2000 | Maurio et al. | ................ 388/811 |
| 6,313,602 B1* | 11/2001 | Arefeen et al. | ............... 318/801 |
| 6,340,851 B1* | 1/2002 | Rinaldi et al. | .................. 307/82 |
| 6,392,905 B1* | 5/2002 | Huang et al. | ................... 363/71 |
| 6,864,646 B2* | 3/2005 | Rahman et al. | ................ 318/41 |
| 2003/0025398 A1* | 2/2003 | Nakamura et al. | ............. 307/72 |
| 2004/0160201 A1* | 8/2004 | Rahman et al. | ................ 318/41 |
| 2005/0225270 A1* | 10/2005 | Schnetzka et al. | .............. 318/66 |
| 2007/0086221 A1* | 4/2007 | Ritter et al. | .................... 363/34 |

FOREIGN PATENT DOCUMENTS

| | | |
|---|---|---|
| EP | 1186464 A2 | 3/2002 |
| EP | 1271067 A1 | 1/2003 |
| JP | 2000 078850 | 3/2000 |
| WO | WO 00/33448 | 6/2000 |

* cited by examiner

*Primary Examiner*—Paul Ip
(74) *Attorney, Agent, or Firm*—McNees Wallace & Nurick, LLC (57) ABSTRACT

A variable speed drive is provided having a converter to convert an AC voltage to a DC voltage, a DC link to filter and store energy from the converter, and a plurality of inverters. Each inverter is configured to convert a DC voltage to an AC voltage and is electrically connected in parallel to the DC link. An interleaved pulse width modulation control technique is used to control the operation of the plurality of inverters and possibly the converter to lower the RMS ripple current in the DC link.

37 Claims, 11 Drawing Sheets

SYSTEM AND METHOD FOR CONTROLLING A VARIABLE SPEED DRIVE

BACKGROUND OF THE INVENTION

The present invention relates generally to the control of variable speed drives. More specifically, the present invention relates to a control technique for a variable speed drive having an active converter and/or multiple inverter stages connected to a common DC link.

A variable speed drive (VSD) can have three stages: a converter stage; a DC link stage; and an inverter stage. The converter stage converts a fixed line frequency, fixed line voltage AC power source to a DC power source. The DC link stage filters the DC voltage from the converter stage. Finally, the inverter stage converts the DC voltage from the DC link stage into a variable frequency, variable voltage AC power source.

A voltage source type VSD may require a large value of capacitance in the DC link stage of the VSD to provide filtering for the converter stage. These capacitors often work in conjunction with an inductor(s) to form a low pass filter in larger VSDs, e.g., VSDs providing more than 100 hp. The inductor(s) may be placed in the DC link stage just before the capacitors, in the AC line that feeds the converter stage, or in both the DC link stage and the AC line feeding the converter stage. The inductors and capacitors forming the low pass filter are passive devices that can be both bulky and expensive and can increase the size and cost of the VSD.

The capacitors used within a VSD are usually of the aluminum electrolytic type and include multilayer "sandwiches" of conducting foil and insulating paper that are rolled into a cylinder and inserted into a cylindrical can. The cans are filled with a liquid electrolyte and two electrical terminals are provided on the can to permit an electrical connection. The conducting foil may be etched to provide improved surface area and lower internal resistance in the capacitor. The internal resistance in the capacitor is the limiting factor with regard to the usage of the capacitor in the DC link stage of the VSD because the power dissipated by the capacitor is limited by the capacitor's ability to reject its own internal power. The internal resistance of the capacitor varies as a function of the frequency of the current flowing through the capacitor and the voltage applied to the capacitor. The internal resistance or equivalent series resistance (ESR) of the capacitor is reduced as the frequency of the current is increased. Capacitor manufacturers want to reduce the capacitor's internal resistance and improve its heat dissipation capability because the internal operating temperature of the capacitor can affect the lifetime of the capacitor. The primary failure mode of an electrolytic capacitor is a loss of electrolyte due to leakage of the electrolyte through the seals of the capacitor can. This leakage of electrolyte from the capacitor can tends to increase as a function of the internal operating temperature of the capacitor leading to a reduction in effective capacitance and eventual wearout or failure of the device.

A voltage source type VSD uses multiple capacitors to provide sufficient filtering for the pulsating DC link ripple current that results from the pulsating converter and inverter currents, which currents converge at the DC link. The size and quantity of the DC link capacitors chosen for a specific application can be based on the magnitude of the ripple current seen at the DC link. Some secondary issues in capacitor selection include the ride-through capability of the VSD in the case of a utility loss of voltage, the magnitude of the resonant frequency associated with the inductive and capacitive elements in the filter of the DC link and the output impedance of the VSD from the motor's standpoint. However, the overriding factor in selecting a capacitor is the life expectancy of the capacitor, which life expectancy is based on the ripple current and the internal operating temperature of the capacitor. The use of multiple inverter stages connected to a single DC link stage can further increase the amount of ripple current in the capacitor by increasing the pulsating inverter currents at the DC link.

Therefore, what is needed is a system and method for controlling a variable speed drive having an active converter and/or multiple inverter stages connected to a common DC link in order to reduce the amount of capacitance required in the DC link or to extend the lifetime of the DC link capacitors in an application.

SUMMARY OF THE INVENTION

One embodiment of the present invention is directed to a method of controlling a variable speed drive having a converter stage, a DC link stage, and an inverter stage. The method includes the step of providing an inverter stage having a plurality of inverters electrically connected in parallel to a DC link stage. Each inverter of the plurality of inverters is configured to power a corresponding load. The method also includes the steps of generating a switching signal for each inverter of the plurality of inverters and interleaving the switching signals for each inverter of the plurality of inverters to reduce RMS ripple current at the DC link stage. The switching signal is operable to activate and deactivate the inverter to obtain a preselected output power and a preselected output frequency from the inverter.

Another embodiment of the present invention is directed to a method of controlling a variable speed drive having a converter stage, a DC link stage, and an inverter stage. The method includes the steps of providing a converter stage having an active converter connected to a DC link stage and providing an inverter stage having at least one inverter electrically connected in parallel to the DC link stage. The method also includes the steps of generating a first switching signal for the active converter, generating a second switching signal for the at least one inverter and interleaving the first switching signal and the second switching signal to reduce RMS ripple current at the DC link stage. The first switching signal is operable to activate and deactivate the active converter to generate a preselected DC voltage at the DC link stage and the second switching signal is operable to activate and deactivate the at least one inverter to obtain a preselected output power and preselected output frequency from the at least one inverter.

Still another embodiment of the present invention is directed to a variable speed drive having a converter stage to convert an AC voltage to a DC voltage, a DC link stage to filter and store energy from the converter stage, and an inverter stage comprising a plurality of inverters electrically connected in parallel to the DC link stage. The converter stage is configured to be electrically connectable to an AC power source and the DC link stage is electrically connected to the converter stage. Each inverter of the plurality of inverters is configured to convert a DC voltage to an AC voltage to power a corresponding load. The variable speed drive further including a control system to control operation of the inverter stage. The control system is configured to generate switching signals for each inverter of the plurality of inverters. The switching signals for each inverter of the plurality of inverters are interleaved with the switching signals for the other inverters of the plurality of inverters.

A further embodiment of the present invention is directed to a chiller system having a first refrigerant circuit with a first compressor driven by a first motor, a first condenser arrangement and a first evaporator arrangement connected in a closed refrigerant loop and a second refrigerant circuit with a second compressor driven by a second motor, a second condenser arrangement and a second evaporator arrangement connected in a closed refrigerant loop. The chiller system also includes a variable speed drive having a converter stage to convert an AC voltage to a DC voltage, a DC link stage to filter and store energy from the converter stage, and an inverter stage comprising a first inverter and a second inverter each electrically connected in parallel to the DC link stage. The converter stage is configured to be electrically connectable to an AC power source and the DC link stage is electrically connected to the converter stage. The first inverter is configured to convert a DC voltage to an AC voltage to power the first motor, and the second inverter is configured to convert a DC voltage to an AC voltage to power the second motor. The chiller system further includes a control panel to control operation of the variable speed drive. The control system is configured to generate switching signals for the first inverter and the second inverter and the switching signals for the first inverter are interleaved with the switching signals for the second inverter to reduce an RMS ripple current in the DC link stage.

One advantage of the present invention is that it can reduce the RMS value of the ripple current seen by the DC link.

Another advantage of the present invention is that the variable speed drive can have a smaller and more inexpensive design while retaining a similar core temperature threshold in the capacitors of the DC link found in a larger and more expensive design.

Still another advantage of the present invention is that it can increase the operating lifetime of both the capacitors and the variable speed drive.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
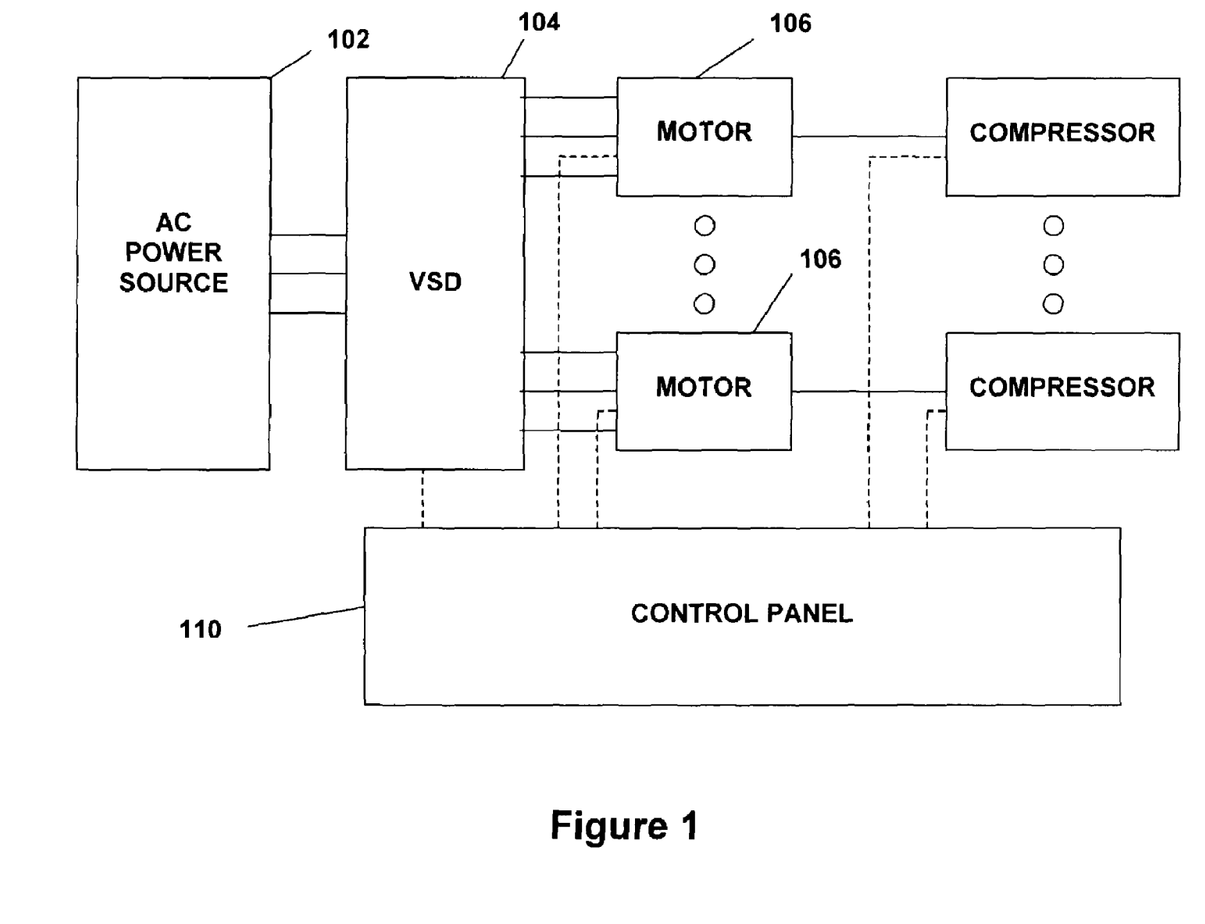
FIG. 1 illustrates a general application of the present invention.

FIG. 1 illustrates generally an application that can be used with the present invention. An AC power source 102 supplies a variable speed drive (VSD) 104, which powers a plurality of motors 106. The motors 106 are preferably used to drive corresponding compressors that can be used in a refrigeration or chiller system. A control panel 110 can be used to control operation of the VSD 104 and can monitor and/or control operation of the motors 106 and compressors.

The AC power source 102 provides single phase or multiphase (e.g., three phase), fixed voltage, and fixed frequency AC power to the VSD 104 from an AC power grid or distribution system that is present at a site. The AC power source 102 preferably can supply an AC voltage or line voltage of 200 V, 230 V, 380 V, 460 V, or 600 V at a line frequency of 50 Hz or 60 Hz, to the VSD 104 depending on the corresponding AC power grid.

The VSD 104 receives AC power having a particular fixed line voltage and fixed line frequency from the AC power source 102 and provides AC power to each of the motors 106 at desired voltages and desired frequencies, both of which can be varied to satisfy particular requirements. Preferably, the VSD 104 can provide AC power to each of the motors 106 that may have higher voltages and frequencies and lower voltages and frequencies than the rated voltage and frequency of each motor 106. In another embodiment, the VSD 104 may again provide higher and lower frequencies but only the same or lower voltages than the rated voltage and frequency of each motor 106.

The motors 106 are preferably induction motors that are capable of being operated at variable speeds. The induction motors can have any suitable pole arrangement including two poles, four poles or six poles. However, any suitable motor that can be operated at variable speeds can be used with the present invention.

Figure 2:
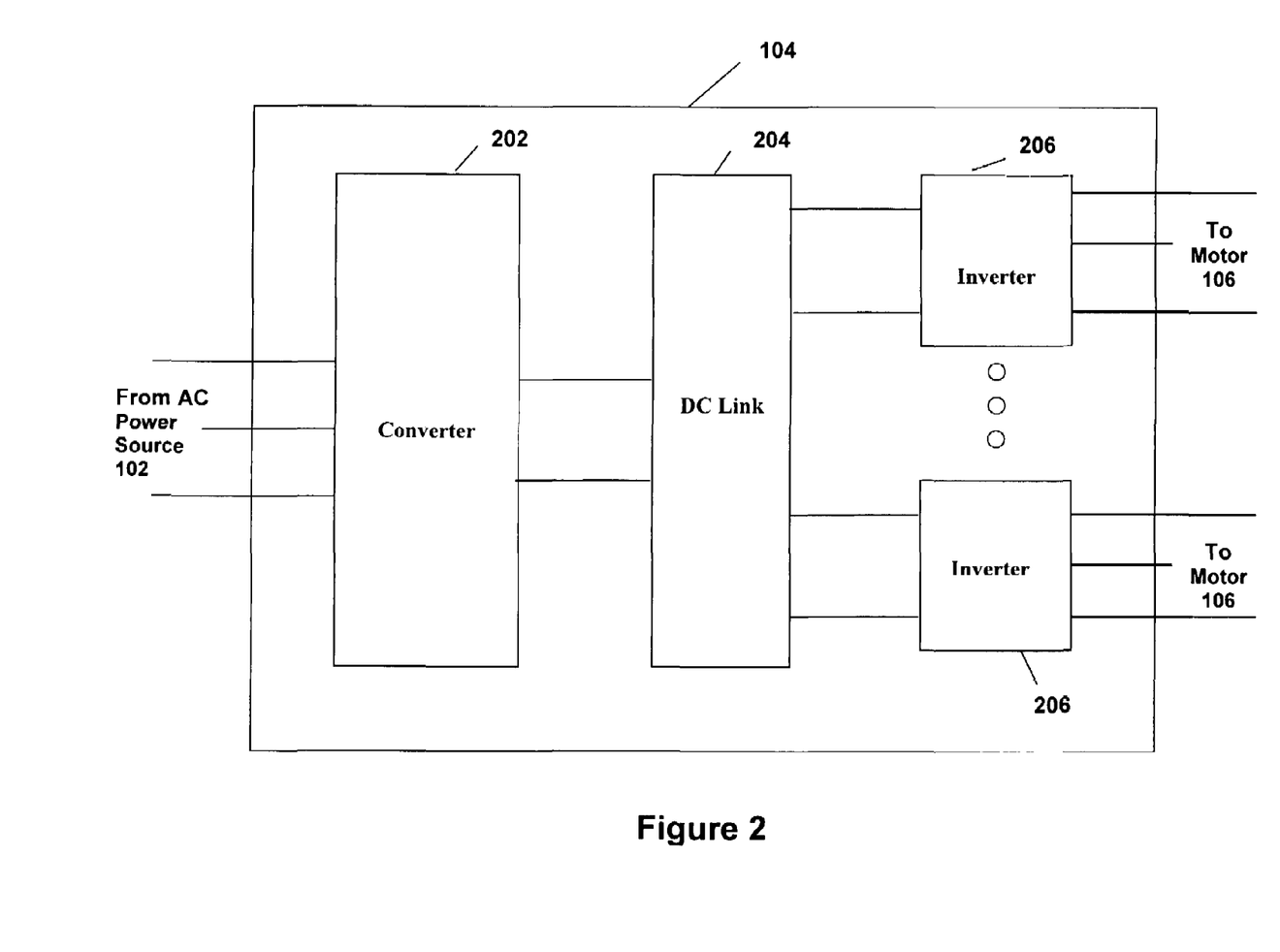
FIG. 2 illustrates schematically a variable speed drive used with the present invention.

FIG. 2 illustrates schematically some of the components in one embodiment of the VSD 104. The VSD 104 can have three stages: a converter or rectifier stage 202, a DC link stage 204 and an output stage having a plurality of inverters 206. The converter 202 converts the fixed line frequency, fixed line voltage AC power from the AC power source 102 into DC power. The converter 202 can be in a rectifier arrangement composed of electronic switches that can only be turned on either by gating, when using silicon controlled rectifiers, or by being forward biased, when using diodes. Alternatively, the converter 202 can be in an active converter arrangement composed of electronic switches that can be gated or switched both on and off, to generate a controlled DC voltage and to shape the input current signal to appear sinusoidal, if so desired. The active converter arrangement of converter 202 has an additional level of flexibility over the rectifier arrangement, in that the AC power not only can be rectified to DC power, but that the DC voltage level can also be controlled to a specific value. In one embodiment of the present invention, the diodes and silicon controlled rectifiers (SCRs) can provide the converter 202 with a large current surge capability and a low failure rate. In another embodiment, the converter 202 can utilize a diode or thyristor rectifier coupled to a boost DC/DC converter or a pulse width modulated boost rectifier to provide a boosted DC voltage to the DC link 204 in order to obtain an output voltage from the VSD 104 greater than the input voltage of the VSD 104.

The DC link 204 filters the DC power from the converter 202 and provides energy storage components. The DC link 204 can be composed of capacitors and inductors, which are passive devices that exhibit high reliability rates, i.e., very low failure rates. Finally, the inverters 206 are connected in parallel on the DC link 204 and each inverter 206 converts the DC power from the DC link 204 into a variable frequency, variable voltage AC power for a corresponding motor 106. The inverters 206 are power modules that can include power transistors, e.g., insulated gate bipolar transistors (IGBTs), with diodes connected in anti-parallel. Furthermore, it is to be understood that the VSD 104 can incorporate different components from those discussed above and shown in FIG. 2 so long as the inverters 206 of the VSD 104 can provide the motors 106 with appropriate output voltages and frequencies.

For each motor 106 to be powered by the VSD 104, there is a corresponding inverter 206 in the output stage of the VSD 104. The number of motors 106 that can be powered by the VSD 104 is dependent upon the number of inverters 206 that are incorporated into the VSD 104. In a preferred embodiment, there can be either 2 or 3 inverters 206 incorporated in the VSD 104 that are connected in parallel to the DC link 204 and used for powering corresponding motors 106. While it is preferred for the VSD 104 to have between 2 and 3 inverters 206, it is to be understood that more than 3 inverters 206 can be used so long as the DC link 204 can provide and maintain the appropriate DC voltage to each of the inverters 206.

In a preferred embodiment, the inverters 206 are jointly controlled by a control system, as discussed in greater detail below, such that each inverter 206 provides AC power at the same desired voltage and frequency to its corresponding motors based on a common control signal or control instruction provided to the inverters 206. The control of the inverters 206 can be by the control panel 110 or other suitable control device that incorporates the control system.

The VSD 104 can prevent large inrush currents from reaching the motors 106 during the startup of the motors 106. In addition, the inverters 206 of the VSD 104 can provide the AC power source 102 with power having about a unity power factor. Finally, the ability of the VSD 104 to adjust both the input voltage and input frequency received by the motor 106 permits a system equipped with VSD 104 to be operated on a variety of foreign and domestic power grids without having to alter the motors 106 for different power sources.

Figure 4A:
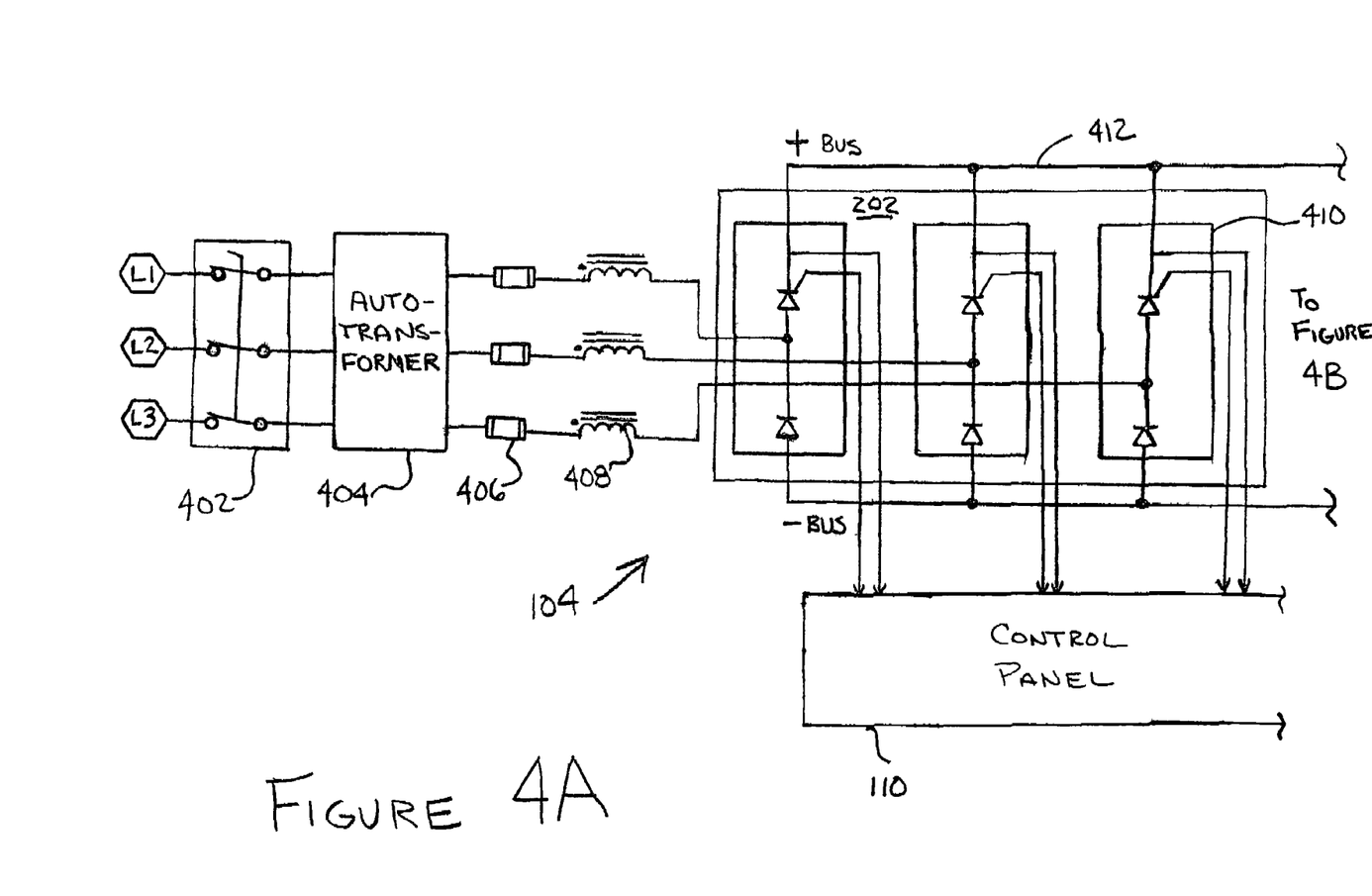
FIGS. 4A and 4B illustrate one embodiment of a variable speed drive used with the present invention.
Figure 4B:
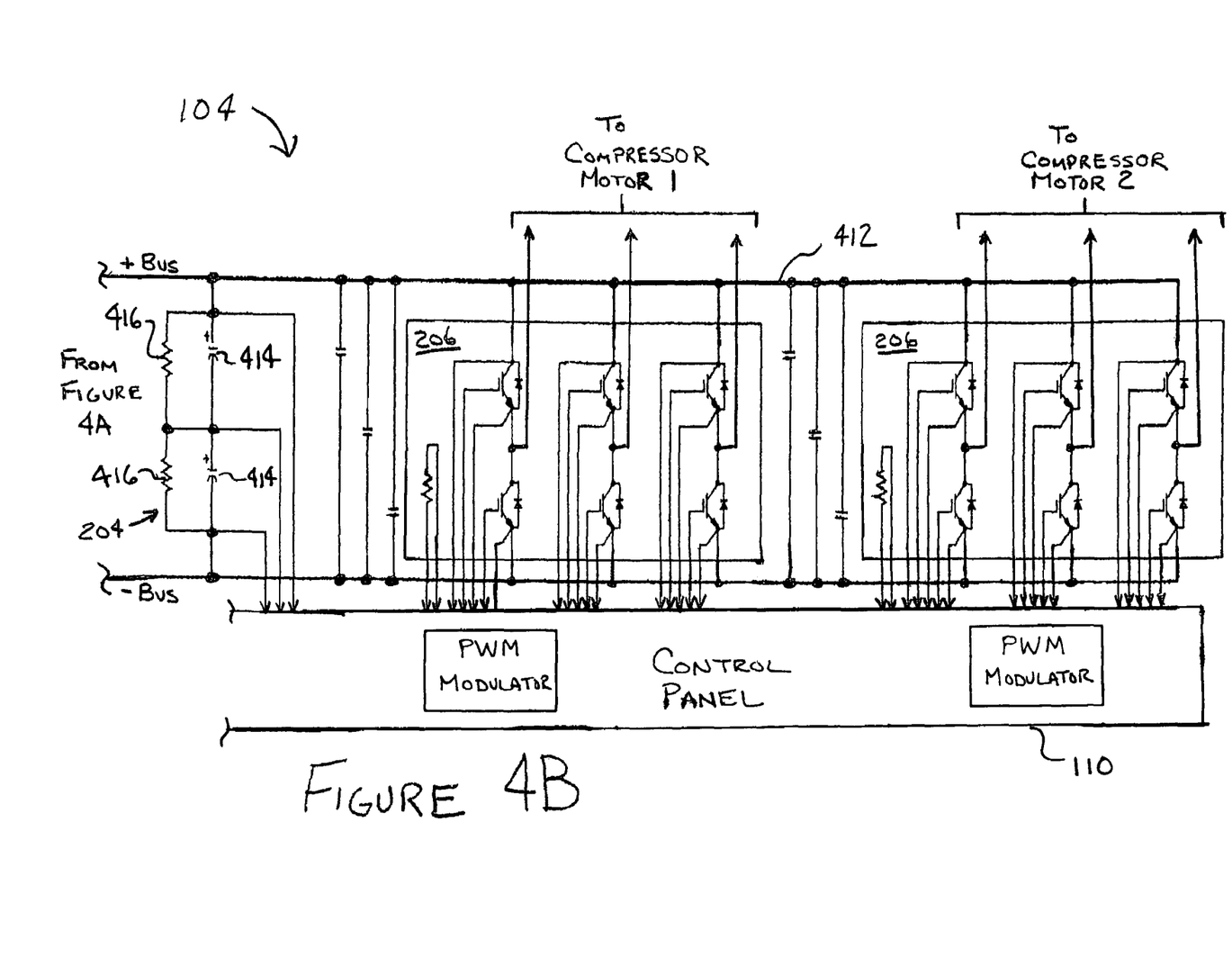

FIGS. 4A and 4B show a circuit diagram for one embodiment of the VSD 104. In this embodiment of the VSD 104, the input lines L1-L3 from the three-phase AC power source 102 are connected to a circuit breaker 402, which circuit breaker 402 can disconnect the VSD 104 from the AC power source 102 when an excess current, voltage or power is provided to the VSD 104 or for use as a system disconnect switch. The circuit breaker 402 can then be connected to an optional autotransformer 404. The autotransformer 404, when used, is preferably used to adjust an input voltage (either up or down) from the AC power source 102 to a desired input voltage. Fuses 406 for each line can be used to disconnect that input phase or line of the VSD 104 in response to an excessive current in that line. Inductors 408 for each line are used to smooth the current in the corresponding line of the VSD. The output of each of the inductors 408 is then provided to a corresponding SCR/diode 410 in the converter 202 to convert each phase of the input AC power to DC power. The converter 202 has a converter configuration using SCR/diode modules 410 and corresponding connections to the control panel 110 to control the switching of the SCRs 410. Each of the SCR/diode modules 410 has one output connected to a positive terminal or rail of a DC bus 412 and a second output connected to the negative terminal or rail of the DC bus 412.

In one embodiment of the present invention, the converter 202 is a passive converter during steady-state operation of the VSD 104 as the SCRs from the SCR/diode modules 410 are fully gated "on" and operate similar to diodes. However, during the initial operation or powering of the VSD 104, the converter 202 is an active converter as gating signals to the SCRs are controlled to permit a slow charging of the capacitors 414 of the DC link 204 and thus a slow charging of the DC link voltage. The slow charging of the capacitors 414 and DC link voltage prevents a large current surge from reaching the capacitors 414 during initial operation or powering of the VSD 104, which current surge could occur if only diodes were used in the converter 202.

Connected in parallel to the outputs of the SCR/diode modules 410 are the DC link 204. The DC link 204 in this embodiment includes capacitors 414 and resistors 416 to filter the DC power and store energy from the DC bus 412. The resistors 416 can function as voltage balancing devices to maintain a substantially equal DC link voltage between capacitor banks 414. The resistors 416 can also function as charge depleting devices to "bleed off" stored voltage in the capacitor banks 414 when the power is removed from the AC power source 102. Also connected to the DC bus 412 are two inverter sections 206, which convert the DC power on the DC bus 412 to three-phase AC power for a compressor motor. In the embodiment shown in FIGS. 4A and 4B, two inverter sections or modules 206 are used. However, additional inverter modules 206 can be added and would have a similar circuit representation to the inverter modules 206 shown in FIG. 4B. The inverter modules 206 include three pairs (one for each output phase) of IGBT power switches and inverse diodes. The inverter modules 206 also include the corresponding connections to the control panel 110 to control the switching of the IGBT power switches.

The inverter modules 206 convert the DC power on the DC bus 412 to three phase AC power by selectively switching each of the IGBT power switches in the inverter module 206 between an "on" or activated position and an "off" or deactivated position using a modulation scheme to obtain the desired AC voltage and frequency from each inverter module 206. A gating signal or switching signal is provided to the IGBT power switches by the control panel 110, based on the modulation scheme, to switch the IGBT power switches between the "on" position and the "off" position. The IGBT power switches are preferably in the "on" position when the switching signal is "High," i.e., a logical one, and in the "off" position when the switching signal is "Low," i.e., a logical zero. However, it is to be understood that the activation and deactivation of the IGBT power switches can be based on the opposite state of the switching signal. Similarly, if an active converter is used for converter 202, the IGBT module that would replace the passive converter, e.g., the SCR/diode stage shown in FIG. 4A, can be switched between corresponding "on" and "off" states in a manner similar to the IGBT power switches in the inverter section 206 of the VSD 104.

In a preferred embodiment of the present invention, the control panel 110 generates the switching signals for the IGBT power switches in the inverter modules 206 using a pulse width modulation (PWM) technique. The control panel 110 preferably has a PWM modulator (see FIG. 4B) for each inverter module 206 to generate the corresponding switching signals for the IGBT power switches in the inverter module 206. Similarly, if an active converter is used, the control panel 110 also has a PWM modulator to generate switching signals for the IGBT module in the converter 202. The PWM modulators are preferably sine-triangular modulators with a third harmonic injection. However, it is to be understood that any suitable PWM modulator can be used to generate the switching signals for the IGBT power switches and active converter modules.

Each PWM modulator has a carrier waveform and a modulating waveform as inputs and generates a switching signal or waveform as an output. The switching signal is generated based on a comparison of the carrier waveform and the modulating waveform. The switching signal is "High," i.e., a logical one, when the modulating waveform amplitude is greater than the carrier waveform amplitude. Similarly, the switching signal is "Low," i.e., a logical zero, when the modulating waveform amplitude is less than the carrier waveform amplitude. It is to be understood that both the amplitude and frequency of both the modulating waveform and carrier waveform can be selected based on the desired frequency and shape of the switching signal output by the PWM modulator.

In one embodiment of the present invention, after the switching signal is generated by the PWM modulator, the control panel 110 can then provide the switching signal to additional circuitry for additional processing, which may or may not be incorporated into the control panel 110, to adjust the switching signal to a form suitable for the IGBT power switches of the inverter modules 206 or for an active converter module. For example, the switching signal can be provided to a driver board that operates to level shift and isolate the switching signal before providing the switching signal to the IGBT power switches.

The control panel 110 executes a control algorithm(s) or software to control operation of the PWM modulators, in particular, the modulating waveforms and carrier waveforms provided to the PWM modulators, to reduce the RMS ripple current value at the DC link 204 to thereby lower the amount of capacitance required by the capacitors 414 of the DC link 204. In one embodiment, the control algorithm(s) can be computer programs or software stored in the non-volatile memory of the control panel 110 and can include a series of instructions executable by the microprocessor of the control panel 110. While it is preferred that the control algorithm be embodied in a computer program(s) and executed by the microprocessor, it is to be understood that the control algorithm may be implemented and executed using digital and/or analog hardware by those skilled in the art. If hardware is used to execute the control algorithm, the corresponding configuration of the control panel 110 can be changed to incorporate the necessary components and to remove any components that may no longer be required.

The control algorithm of the present invention controls the modulating waveforms and the carrier waveforms provided to the PWM modulators to generate switching signals from the PWM modulators that are interleaved with one another. The interleaving of the switching signals from the PWM modulators reduces the amount of RMS ripple current at the DC link 204 to thereby enable the DC link 204 to use a smaller value of capacitance in the capacitors 414 then would be required if there was no interleaving of the switching signals, or to enable the DC link 204 to have a longer service life by lowering the maximum temperature generated in the capacitors 414. In addition, the interleaving of the switching signals can increase the effective frequency of the DC link current seen by the DC link 204.

In one embodiment of the present invention, the control algorithm interleaves the switching signals provided to each inverter module 206 in a multiple inverter VSD 104. The switching signals for the inverter modules 206 can be interleaved by providing a common modulating signal and a phase shifted or time shifted carrier signal to each PWM modulator. In another embodiment, the switching signals for the inverter modules 206 can be interleaved by providing a common carrier signal and a phase shifted or time shifted modulating signal to each PWM modulator. When two inverter modules are used, the carrier signals (or the modulating signals) can be shifted between about 30 degrees and about 90 degrees out of phase with one another. Preferably, the shift between the signals is between about 60 degrees and about 90 degrees, including a preferred shift of about 72 degrees, and is most preferably about 90 degrees. In contrast, when more than two inverter modules are used, the carrier signals (or the modulating signals) of at least one inverter module can be shifted between about 30 degrees and about 90 degrees out of phase with the other inverter modules. Preferably, the shift between each of the signals is between about 45 degrees and about 75 degrees and is most preferably about 60 degrees. In still a further embodiment, the switching signals for the inverter modules 206 can be interleaved by the control algorithm to generate a switching signal for one inverter module 206 then using a simple digital delay line on the switching signal to generate a phase shifted or time shifted switching signal for the other inverter modules 206.

Figure 5A:
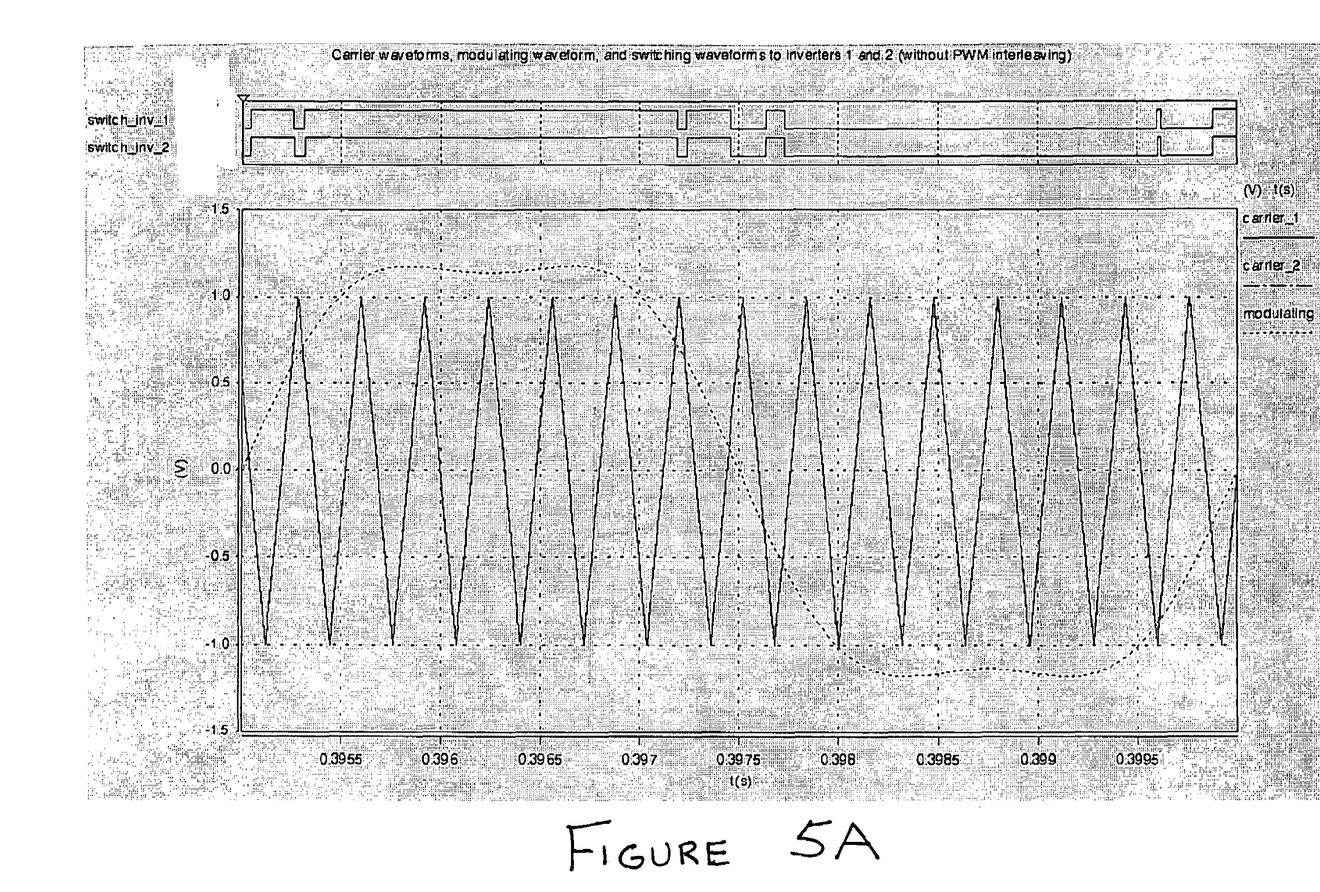
FIGS. 5A-5C illustrate configurations of modulating waveforms and carrier waveforms for generating switching signals in a PWM modulator.
Figure 5B:
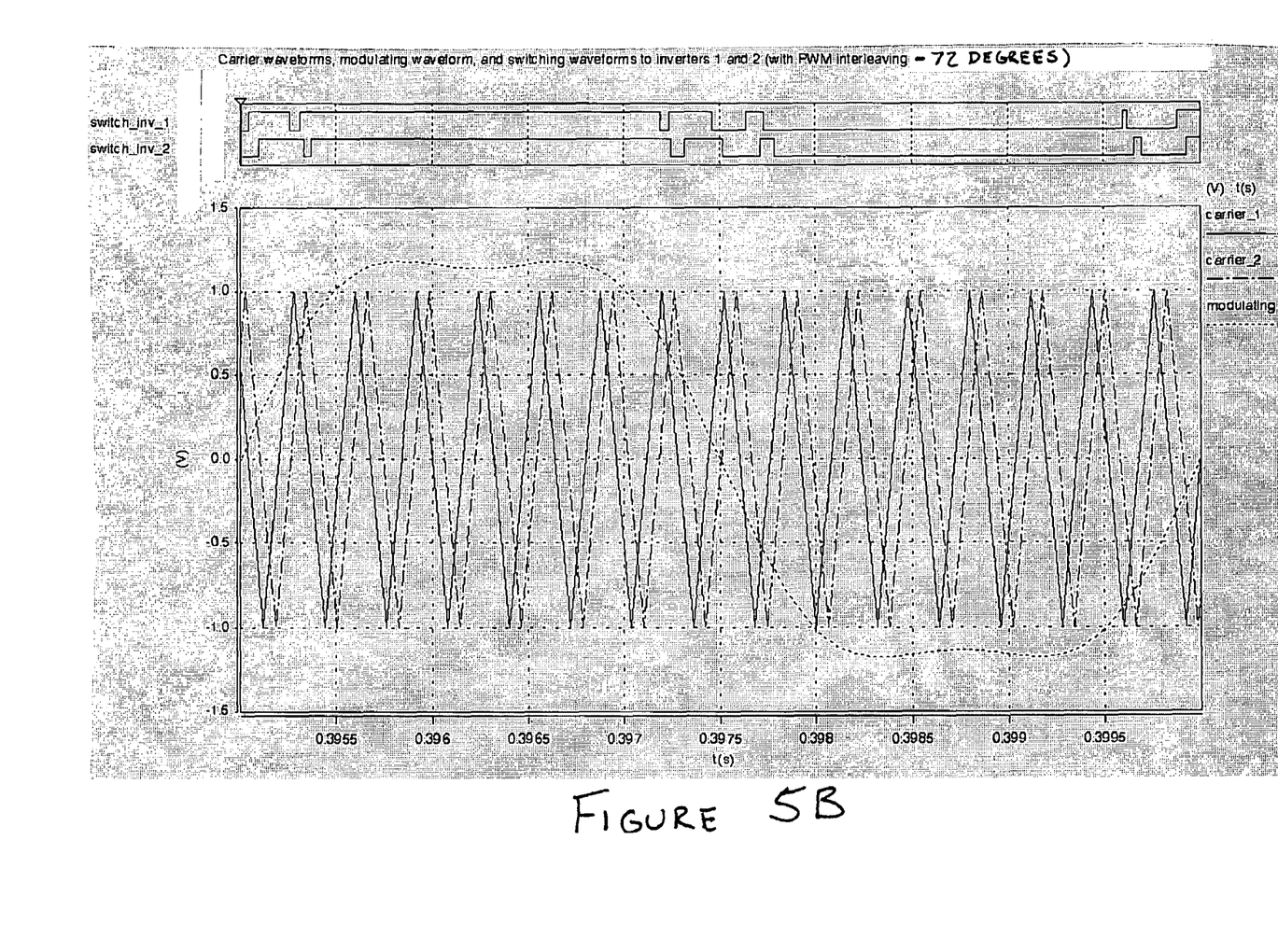
Figure 5C:
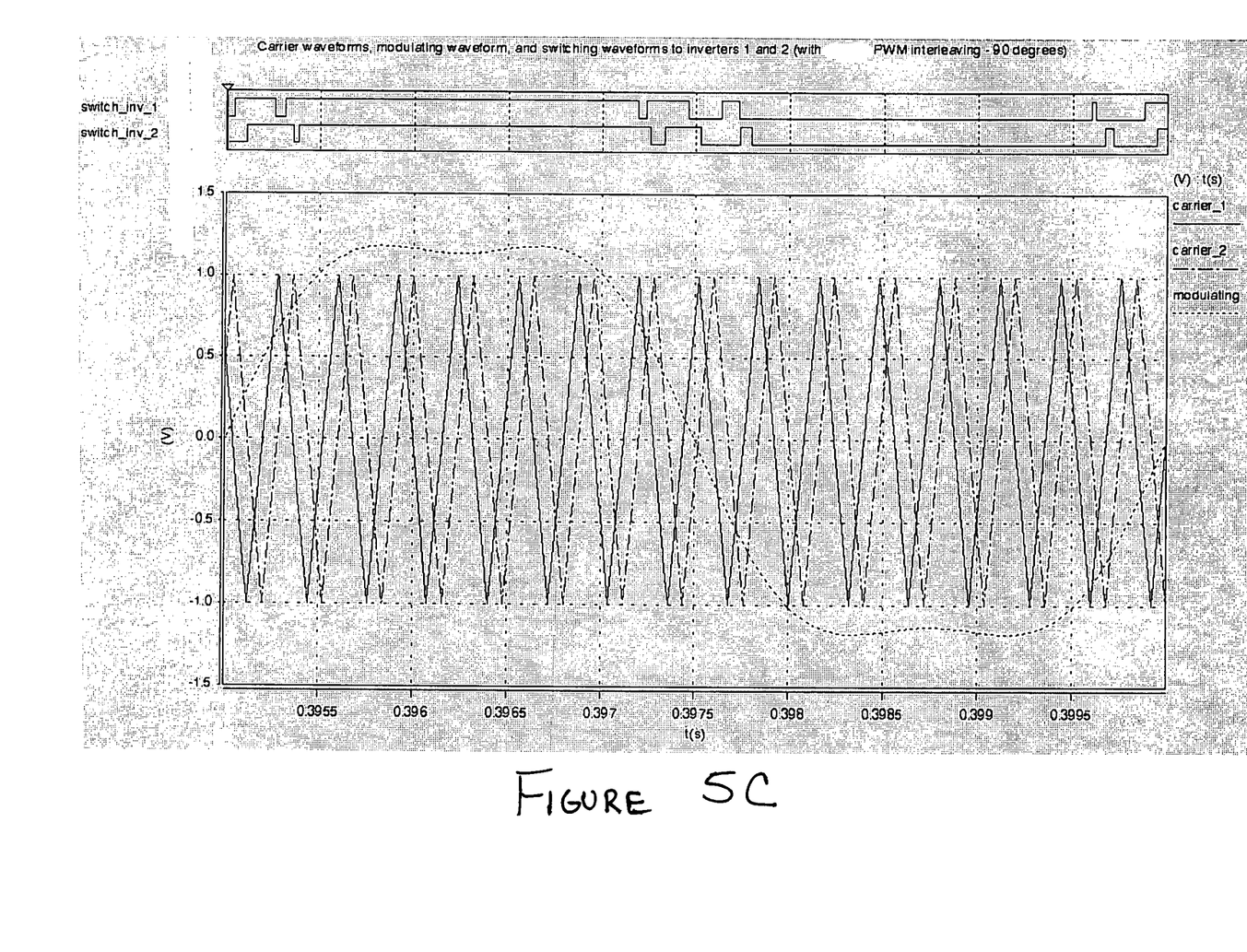

FIGS. 5A-5C illustrate different configurations for the modulating waveform and the carrier waveform for the PWM modulators of a variable speed drive 104 having two inverter modules 206, such as the one shown in FIGS. 4A and 4B. FIGS. 5A-5C also show the corresponding switching waveform generated by the PWM modulators to be provided to the corresponding inverter modules 206. In FIG. 5A, the PWM modulators receive both a common modulating waveform and a common carrier waveform and generate substantially identical switching signals without any interleaving of the switching signals. In FIG. 5B, the PWM modulators receive a common modulating waveform and carrier waveforms that are phase shifted by 72 degrees. This phase shifting of 72 degrees of the carrier waveforms provides for a phase shift and interleaving of the corresponding switching signals for the inverter modules 206 as shown in FIG. 5B. In FIG. 5C, the PWM modulators receive a common modulating waveform and carrier waveforms that are phase shifted by 90 degrees. This phase shifting of 90 degrees of the carrier waveforms provides for a phase shift and interleaving of the corresponding switching signals for the inverter modules 206 as shown in FIG. 5C.

The switching signals generated in FIGS. 5A-5C were then applied to a simulation program, Saber 2003.6, to simulate the performance of a VSD that is similar in configuration to the one shown in FIGS. 4A-4B and is connected to corresponding motors. The simulation program used the following parameters: line voltage—460 V; line frequency—60 Hz; line inductance—115 uH per phase; DC link capacitance—18 mF; motor stator resistance—25 mohm; motor stator leakage inductance—166 uH; motor rotor resistance—27 mohm; motor rotor leakage inductance—196 uH; motor magnetizing inductance—6.28 mH; motor slip—3.4%; inverter output frequency—200 Hz; and inverter switching frequency—3125 Hz.

Figure 6A:
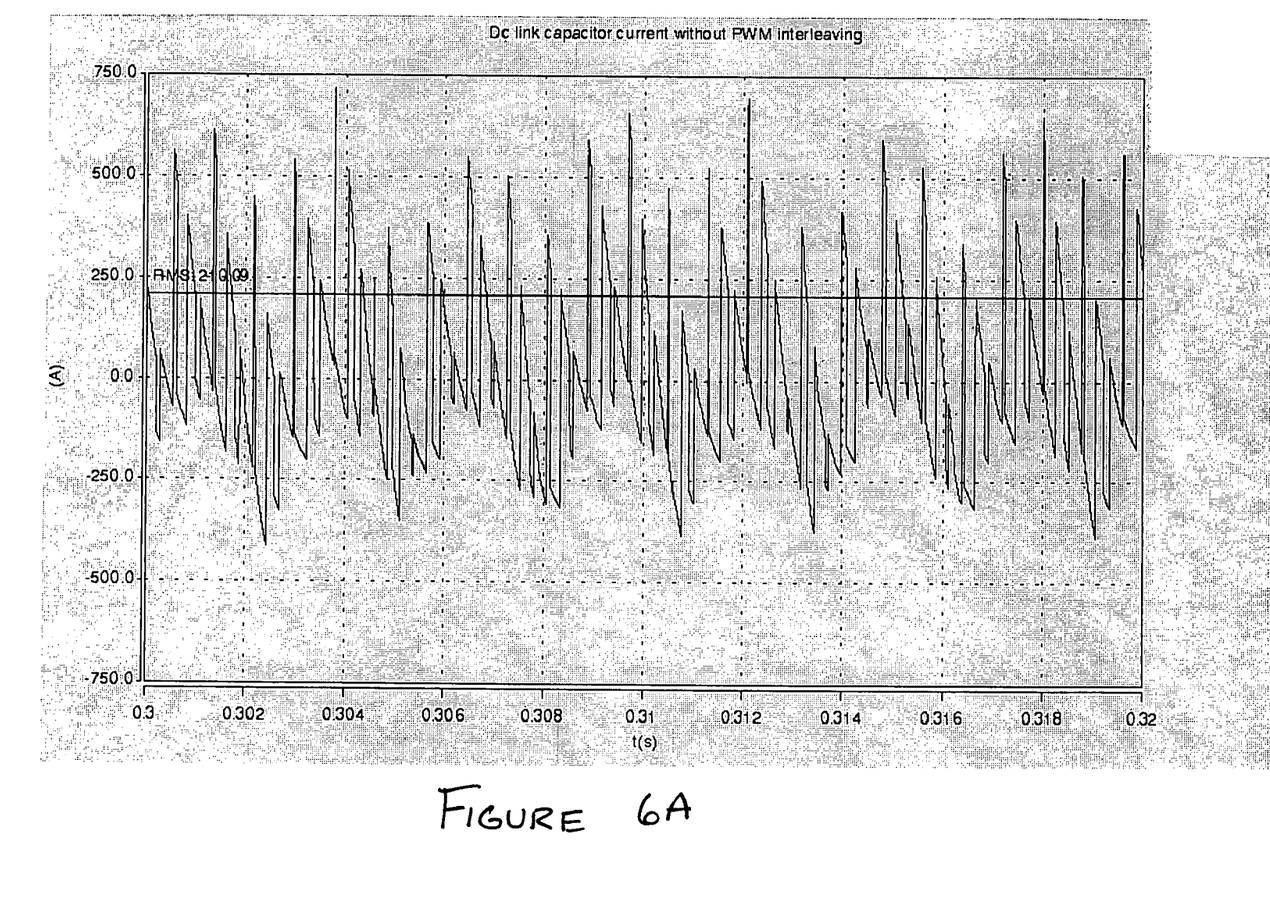
FIGS. 6A-6C illustrate simulated DC link capacitor ripple current values in response to the switching signals generated in FIGS. 5A-5C.
Figure 6B:
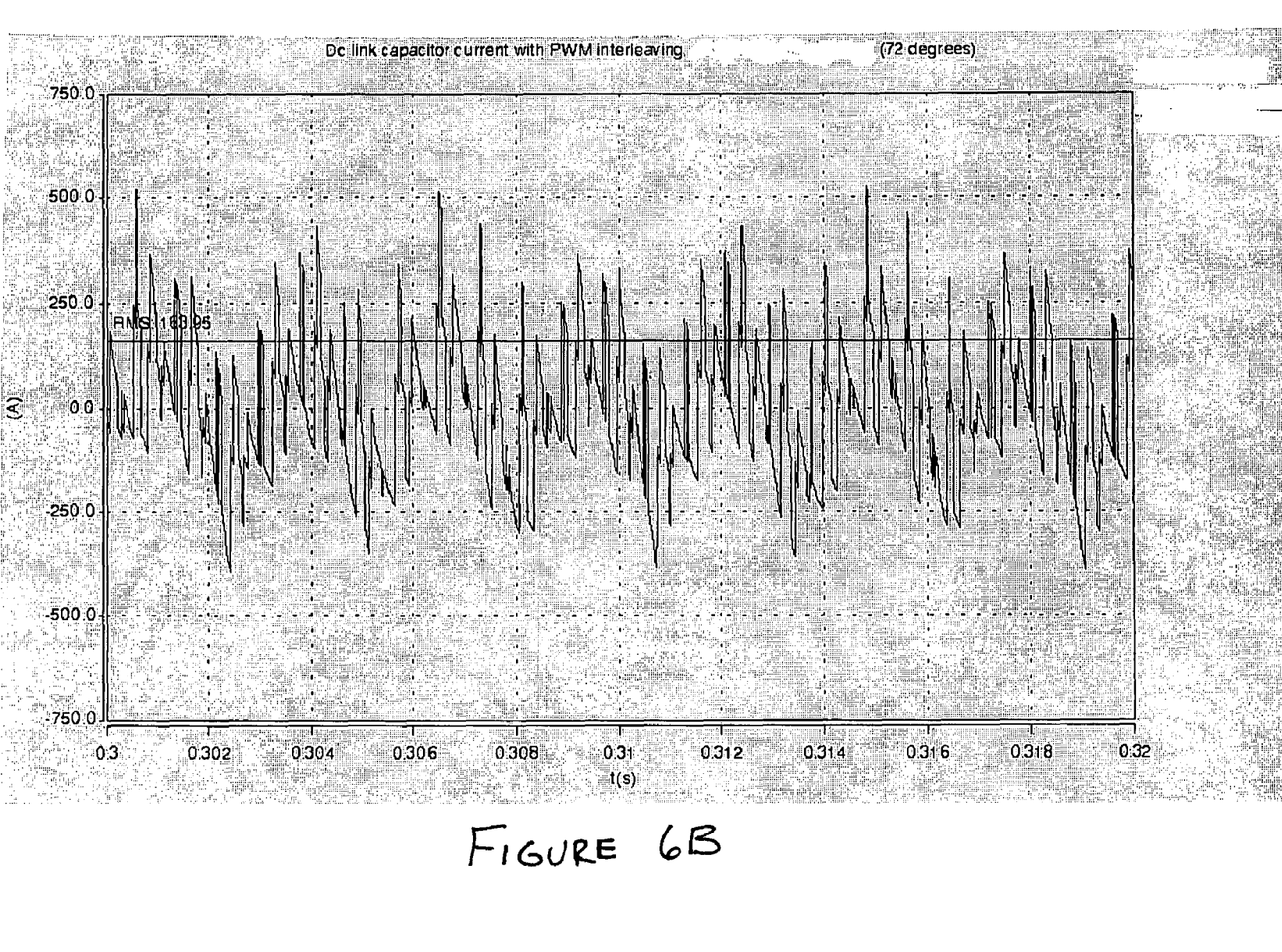
Figure 6C:
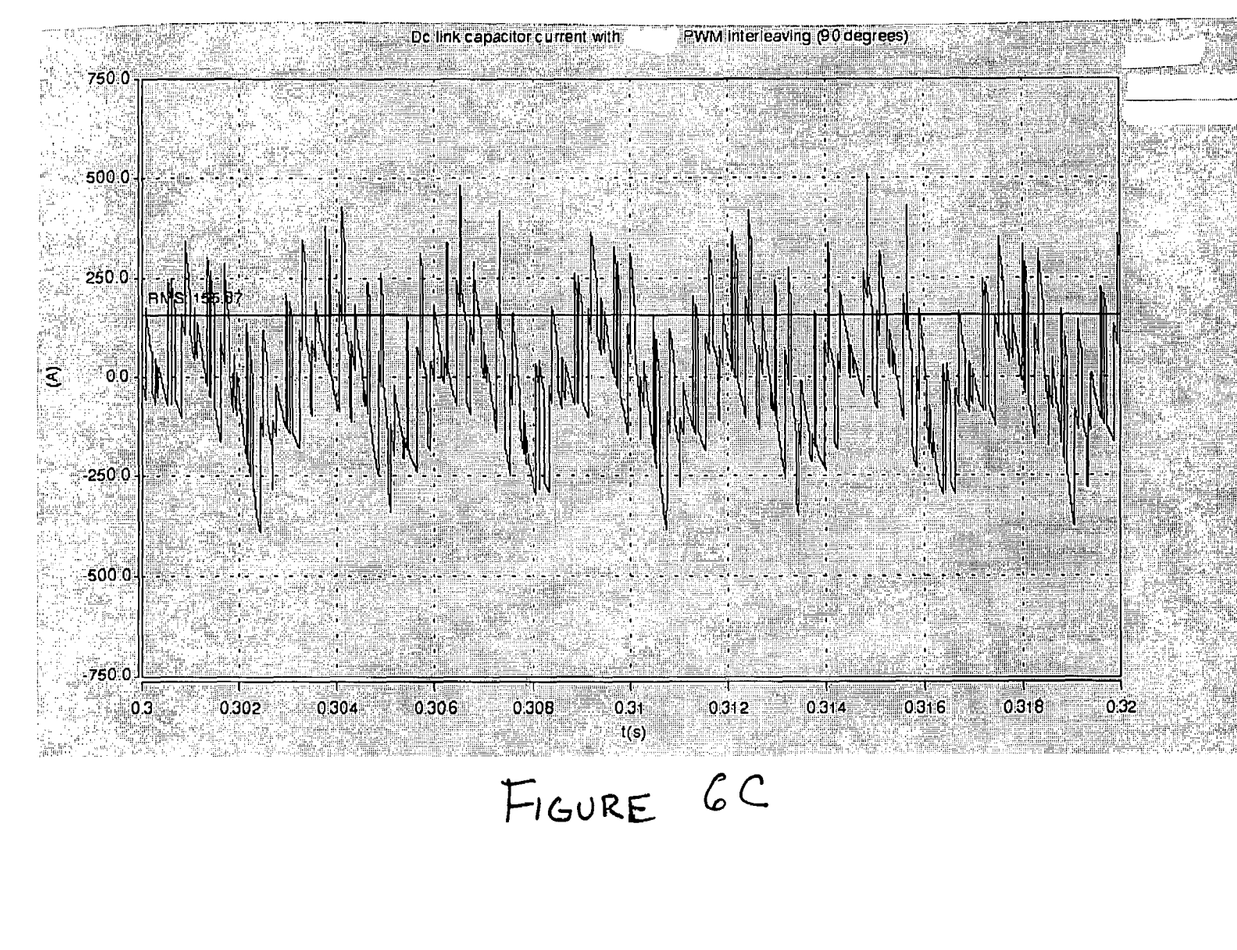

FIGS. 6A-6C illustrate the corresponding simulated DC link ripple current values from the simulation of the VSD, as described in detail above. In FIG. 6A, the RMS value of the DC link current is 210.09 A. In FIG. 6B, the RMS value of the DC link current is 163.95 A. In FIG. 6C, the RMS value of the DC link current is 155.87 A. Thus, the interleaving of the switching signals of the inverter modules 206 by phase shifting the corresponding carrier signals provided to the PWM modulators reduces the RMS DC link ripple current at the DC link 204.

In another embodiment of the present invention with a VSD 104 having an active converter 202 and multiple inverter modules 206, the control algorithm can interleave the switching signals provided to the active converter 202 by a PWM modulator with the switching signals provided to each inverter module 206 by corresponding PWM modulators. The switching signals for the inverter modules 206 and the active converter 202 can be interleaved by providing a phase shifted or time shifted carrier signal to each PWM modulator. The carrier signals can be shifted between about 30 degrees and about 90 degrees out of phase with one another. Preferably, the phase shift between the signals is between about 60 degrees and about 90 degrees.

In still another embodiment of the present invention with a VSD having an active converter and only a single inverter, the control algorithm can interleave the switching signals provided to the active converter by a PWM modulator with the switching signals provided to the inverter by a PWM modulator. The switching signals for the inverter and the active converter can be interleaved by providing a phase shifted or time shifted carrier signal to each PWM modulator. The carrier signals can be shifted between about 30 degrees and about 90 degrees out of phase with one another. Preferably, the phase shift between the signals is between about 60 degrees and about 90 degrees and is most preferably about 90 degrees. In a related embodiment of the present invention, if a single PWM modulator is used to provide switching signals to multiple inverter modules, the switching signals for the active converter and the multiple inverter modules can be interleaved as described above for a single inverter.

Figure 3:
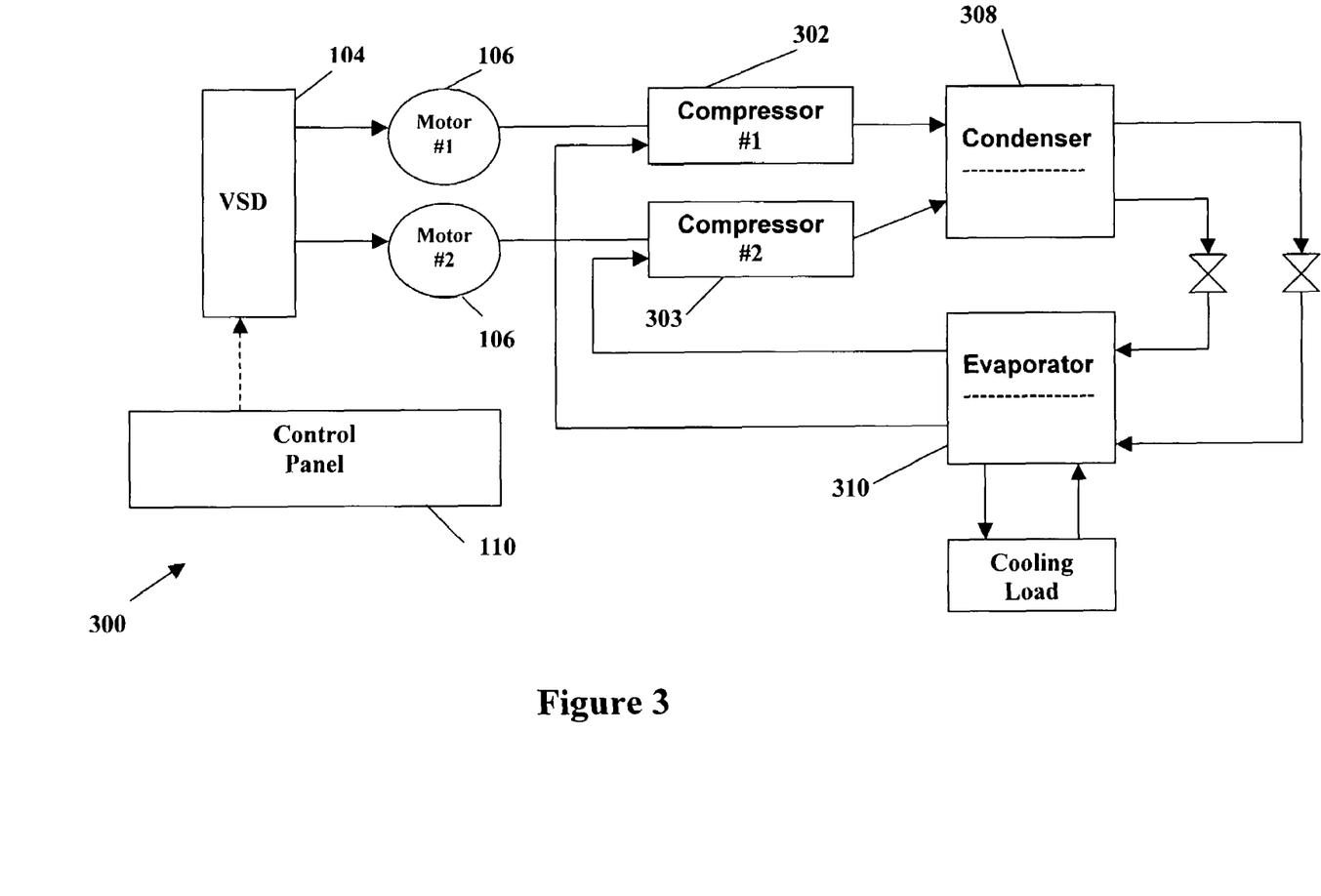
FIG. 3 illustrates an embodiment of the present invention used with a refrigeration or chiller system.

FIG. 3 illustrates generally one embodiment of the present invention incorporated in a refrigeration system. As shown in FIG. 3, the HVAC, refrigeration or liquid chiller system 300 has two compressors incorporated in corresponding refrigerant circuits, but it is to be understood that the system 300 can have one refrigerant circuit or more than two refrigerant circuits for providing the desired system load and can have more than a one compressor for a corresponding refrigerant circuit. The system 300 includes a first compressor 302, a second compressor 303, a condenser arrangement 308, expansion devices, a water chiller or evaporator arrangement 310 and the control panel 110. The control panel 110 can include an analog to digital (A/D) converter, a microprocessor, a nonvolatile memory, and an interface board to control operation of the refrigeration system 300. The control panel 110 can be used to control the operation of the VSD 104, the motors 106 and the compressors 302 and 303. A conventional HVAC, refrigeration or liquid chiller system 300 includes many other features that are not shown in FIG. 3. These features have been purposely omitted to simplify the drawing for ease of illustration.

The compressors 302 and 303 compress a refrigerant vapor and deliver it to the condenser 308. The compressors 302 and 303 are preferably connected in separate refrigeration circuits, i.e., the refrigerant output by the compressors 302 and 303 are not mixed and travel in separate circuits through the system 300 before reentering the compressors 302 and 303 to begin another cycle. The separate refrigeration circuits preferably use a single condenser housing 308 and a single evaporator housing 310 for the corresponding heat exchanges. The condenser housing 308 and evaporator housing 310 maintain the separate refrigerant circuits either through a partition or other dividing means with the corresponding housing or with separate coil arrangements. In another embodiment of the present invention, the refrigerant output by the compressors 302 and 303 can be combined into a single refrigerant circuit to travel through the system 300 before being separated to reenter the compressors 302 and 303.

The compressors 302 and 303 are preferably screw compressors or centrifugal compressors, however the compressors can be any suitable type of compressor including reciprocating compressors, scroll compressors, rotary compressors or other type of compressor. The output capacity of the compressors 302 and 303 can be based on the operating speed of the compressors 302 and 303, which operating speed is dependent on the output speed of the motors 106 driven by the inverters 206 of the VSD 104. The refrigerant vapor delivered to the condenser 308 enters into a heat exchange relationship with a fluid, e.g., air or water, and undergoes a phase change to a refrigerant liquid as a result of the heat exchange relationship with the fluid. The condensed liquid refrigerant from condenser 308 flows through corresponding expansion devices to an evaporator 310.

The evaporator 310 can include connections for a supply line and a return line of a cooling load. A secondary liquid, which is preferably water, but can be any other suitable secondary liquid, e.g. ethylene, calcium chloride brine or sodium chloride brine, travels into the evaporator 310 via return line and exits the evaporator 310 via supply line. The liquid refrigerant in the evaporator 310 enters into a heat exchange relationship with the secondary liquid to chill the temperature of the secondary liquid. The refrigerant liquid in the evaporator 310 undergoes a phase change to a refrigerant vapor as a result of the heat exchange relationship with the secondary liquid. The vapor refrigerant in the evaporator 310 then returns to the compressors 302 and 303 to complete the cycle. It is to be understood that any suitable configuration of condenser 308 and evaporator 310 can be used in the system 300, provided that the appropriate phase change of the refrigerant in the condenser 304 and evaporator 306 is obtained.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of controlling a variable speed drive having a converter stage, a DC link stage, and an inverter stage, the method comprising:

providing an inverter stage having a plurality of inverters electrically connected in parallel to a DC link stage, each inverter of the plurality of inverters being configured to power a corresponding load;

generating a switching signal for each inverter of the plurality of inverters with a plurality of modulators, the switching signal being operable to activate and deactivate the inverter to obtain a preselected output power and a preselected output frequency from the inverter, wherein generating a switching signal comprises:

providing a common input signal to the plurality of modulators; and providing a phase shifted or time shifted input signal to each modulator of the plurality of modulators, wherein the phase shifted or time shifted input signal for one of the modulators being shifted relative to the corresponding input signal provided to the other modulators; and interleaving the switching signals for each inverter of the plurality of inverters to reduce RMS ripple current at the DC link stage.

2. The method of claim 1 wherein generating a switching signal comprises providing a modulator for each inverter of the plurality of inverters to generate the switching signal for each inverter of the plurality of inverters.

3. The method of claim 2 wherein generating a switching signal comprises:

inputting a carrier signal to each modulator; and
inputting a modulating signal to each modulator.

4. The method of claim 3 wherein interleaving the switching signals for each inverter of the plurality of inverters comprises shifting the carrier signal input to each modulator by a predetermined phase shift.

5. The method of claim 4 wherein the predetermined phase shift of the carrier signal is between about 30 degrees and about 90 degrees.

6. The method of claim 4 wherein the plurality of inverters comprises two inverters and the predetermined phase shift is about 90 degrees.

7. The method of claim 4 wherein the plurality of inverters comprises three inverters and the predetermined phase shift is about 60 degrees.

8. The method of claim 4 wherein the plurality of inverters comprises two inverters and the predetermined phase shift is about 72 degrees.

9. The method of claim 3 wherein interleaving the switching signals for each inverter of the plurality of inverters comprises shifting the modulating signal input to each modulator by a predetermined phase shift.

10. The method of claim 9 wherein the predetermined phase shift of the modulating signal is between about 30 degrees and about 90 degrees.

11. The method of claim 3 wherein interleaving the switching signals for each inverter of the plurality of inverters comprises shifting the carrier signal input to each modulator by a predetermined time shift.

12. The method of claim 3 wherein interleaving the switching signals for each inverter of the plurality of inverters comprises shifting the modulating signal input to each modulator by a predetermined time shift.

13. A method of controlling a variable speed drive having a converter stage, a DC link stage, and an inverter stage, the method comprising:
providing an inverter stage having a plurality of inverters electrically connected in parallel to a DC link stage, each inverter of the plurality of inverters being configured to power a corresponding load;
generating a switching signal for each inverter of the plurality of inverters, the switching signal being operable to activate and deactivate the inverter to obtain a preselected output power and a preselected output frequency from the inverter, wherein generating a switching signal comprises providing a modulator to generate a single switching signal; and
interleaving the switching signals for each inverter of the plurality of inverters to reduce RMS ripple current at the DC link stage, wherein interleaving the switching signals for each inverter of the plurality of inverters comprises:
providing the single switching signal to one inverter of the plurality of inverters; and
delaying the single switching signal by predetermined amounts before providing the delayed single switching signals to the remaining inverters of the plurality of inverters.

14. A method of controlling a variable speed drive having a converter stage, a DC link stage, and an inverter stage, the method comprising the steps of:
providing a converter stage having an active converter connected to a DC link stage;
providing an inverter stage having at least one inverter electrically connected in parallel to the DC link stage;
generating a first switching signal for the active converter, the first switching signal being operable to activate and deactivate the active converter to generate a preselected DC voltage at a DC link stage;
generating a second switching signal for the at least one inverter, the second switching signal being operable to activate and deactivate the at least one inverter to obtain a preselected output power and preselected output frequency from the at least one inverter; and
interleaving the first switching signal and the second switching signal to reduce RMS ripple current at the DC link stage.

15. The method of claim 14 wherein:
the step of generating a first switching signal for the active converter includes the steps of:
providing a first modulator to generate the first switching signal for the active converter; and
inputting a carrier signal to the first modulator; and
the step of generating a second switching signal for the at least one inverter includes the steps of:
providing a second modulator to generate the second switching signal for the at least one inverter; and
inputting the carrier signal to the second modulator.

16. The method of claim 15 wherein the step of interleaving the first switching signal and the second switching signal includes the step of shifting the carrier signal input to the second modulator by a predetermined phase shift.

17. The method of claim 16 wherein the predetermined phase shift of the carrier signal input to the second module is between about 30 degrees and about 90 degrees.

18. The method of claim 17 wherein the predetermined phase shift of the carrier signal input to the second module is about 90 degrees.

19. A variable speed drive comprising:
a converter stage to convert an AC voltage to a DC voltage, the converter stage being configured to be electrically connectable to an AC power source;
a DC link stage to filter and store energy from the converter stage, the DC link stage being electrically connected to the converter stage;
an inverter stage comprising a plurality of inverters electrically connected in parallel to the DC link stage, each inverter of the plurality of inverters being configured to convert a DC voltage to an AC voltage to power a corresponding load;
a control system to control operation of the inverter stage, the control system comprising a plurality of modulators configured to generate switching signals for each inverter of the plurality of inverters, the control system being configured to provide a common input signal to the plurality of modulators and a phase shifted or time shifted input signal to each modulator of the plurality of modulators, the phase shifted or time shifted input signal for one of the modulators being shifted relative to the corresponding input signal provided to the other modulators; and
wherein the switching signals for each inverter of the plurality of inverters are interleaved with the switching signals for the other inverters of the plurality of inverters.

20. The variable speed drive of claim 19 wherein the plurality of modulators are each configured to use a pulse width modulation technique, and each modulator of the plurality of modulators comprising a carrier signal input to receive a carrier signal from the control system and a modulating signal input to receive a modulating signal from the control system.

21. The variable speed drive of claim 20 wherein the control system is configured to shift the carrier signal provided to the carrier signal inputs of the plurality of modulators by a predetermined phase shift.

22. The variable speed drive of claim 21 wherein the predetermined phase shift of the carrier signal is between about 30 degrees and about 90 degrees.

23. The variable speed drive of claim 22 wherein the plurality of inverters comprises two inverters and the predetermined phase shift is about 90 degrees.

24. The variable speed drive of claim 22 wherein the plurality of inverters comprises three inverters and the predetermined phase shift is about 60 degrees.

25. The variable speed drive of claim 22 wherein the plurality of inverters comprises two inverters and the predetermined phase shift is about 72 degrees.

26. The variable speed drive of claim 20 wherein the control system is configured to shift the modulating signal provided to the modulating signal inputs of the plurality of modulators by a predetermined phase shift.

27. The variable speed drive of claim 26 wherein the predetermined phase shift of the modulating signal is between about 30 degrees and about 90 degrees.

28. The variable speed drive of claim 20 wherein the control system is configured to shift the carrier signal provided to the carrier signal inputs of the plurality of modulators by a predetermined time shift.

29. The variable speed drive of claim 20 wherein the control system is configured to shift the modulating signal provided to the modulating signal inputs of the plurality of modulators by a predetermined time shift.

30. The variable speed drive of claim 19 wherein the interleaving of the switching signals for each inverter of the plurality of inverters results in a reduced RMS ripple current in the DC link stage.

31. A chiller system comprising:
a first refrigerant circuit, the first refrigerant circuit comprising a first compressor driven by a first motor, a first condenser and a first evaporator connected in a closed refrigerant loop;
a second refrigerant circuit, the second refrigerant circuit comprising a second compressor driven by a second motor, a second condenser and a second evaporator connected in a closed refrigerant loop;
a variable speed drive comprising:
a converter stage to convert an AC voltage to a DC voltage, the converter stage being configured to be electrically connectable to an AC power source;
a DC link stage to filter and store energy from the converter stage, the DC link stage being electrically connected to the converter stage; and
an inverter stage comprising a first inverter and a second inverter each electrically connected in parallel to the DC link stage, the first inverter being configured to convert a DC voltage to an AC voltage to power the first motor, and the second inverter being configured to convert a DC voltage to an AC voltage to power the second motor;
a control system to control operation of the variable speed drive, the control system comprising a first modulator configured to generate switching signals for the first inverter and a second modulator configured to generate switching signals for the second inverter, the control system being configured to provide a common input signal to both the first modulator and the second modulator and a phase shifted or time shifted input signal to the first modulator and the second modulator, the phase shifted or time shifted input signal for one of the modulators being shifted relative to the corresponding input signal for the other modulator; and
wherein the switching signals for the first inverter are interleaved with the switching signals for the second inverter to reduce an RMS ripple current in the DC link stage.

32. The chiller system of claim 31 wherein the first modulator is configured to use a pulse width modulation technique to generate a switching signal for the first inverter and the second modulator is configured to use a pulse width modulation technique to generate a switching signal for the second inverter, the first modulator and the second modulator each including a carrier signal input to receive a carrier signal from the control system and a modulating signal input to receive a modulating signal from the control system.

33. The chiller system of claim 32 wherein the control system is configured to shift the carrier signal provided to one of the first modulator and the second modulator.

34. The chiller system of claim 33 wherein the carrier signal is shifted by a predetermined phase shift.

35. The chiller system of claim 34 wherein the predetermined phase shift is between about 30 degrees and about 90 degrees.

36. The chiller system of claim 32 wherein the control system is configured to shift the modulating signal provided to one of the first modulator and the second modulator.

37. The chiller system of claim 32 wherein:
the converter stage comprises an active converter;
the control system comprises a third modulator using a pulse width modulation technique to generate a switching signal for the active converter, the third modulator including a carrier signal input to receive a carrier signal and a modulating signal input to receive a modulating signal; and
the control system is configured to shift the carrier signal provided to the third modulator to interleave the switching signal for the active converter with the switching signals for the first inverter and the second inverter.

* * * * *